Dec. 14, 1954  R. E. McCOY  2,696,848
RELAY WIRE CONTACT INSERTING MACHINE
Filed Oct. 5, 1949  11 Sheets-Sheet 1

INVENTOR
Ralph E. McCoy
BY
Hutchinson & Hutchinson
ATTORNEYS

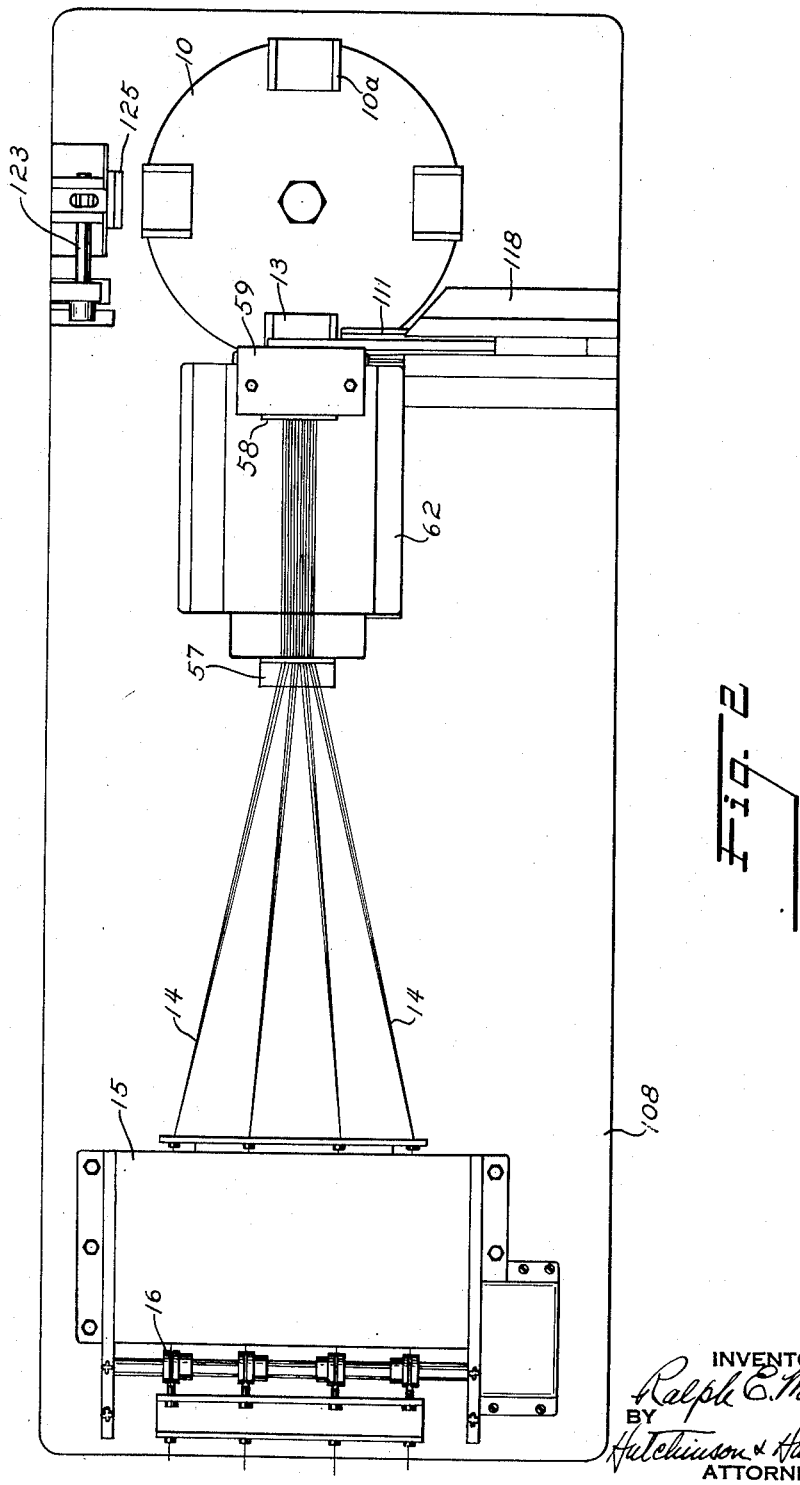

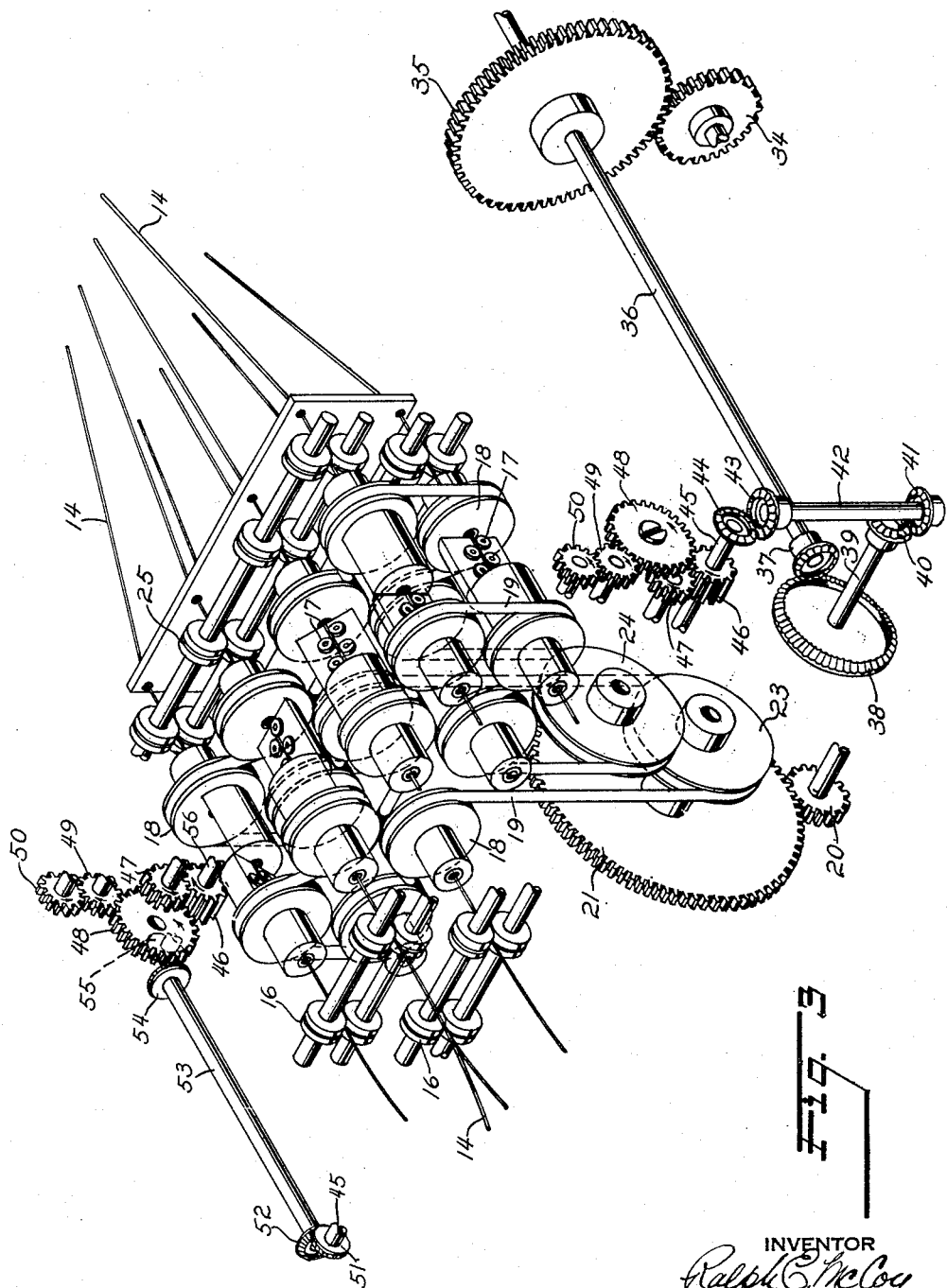

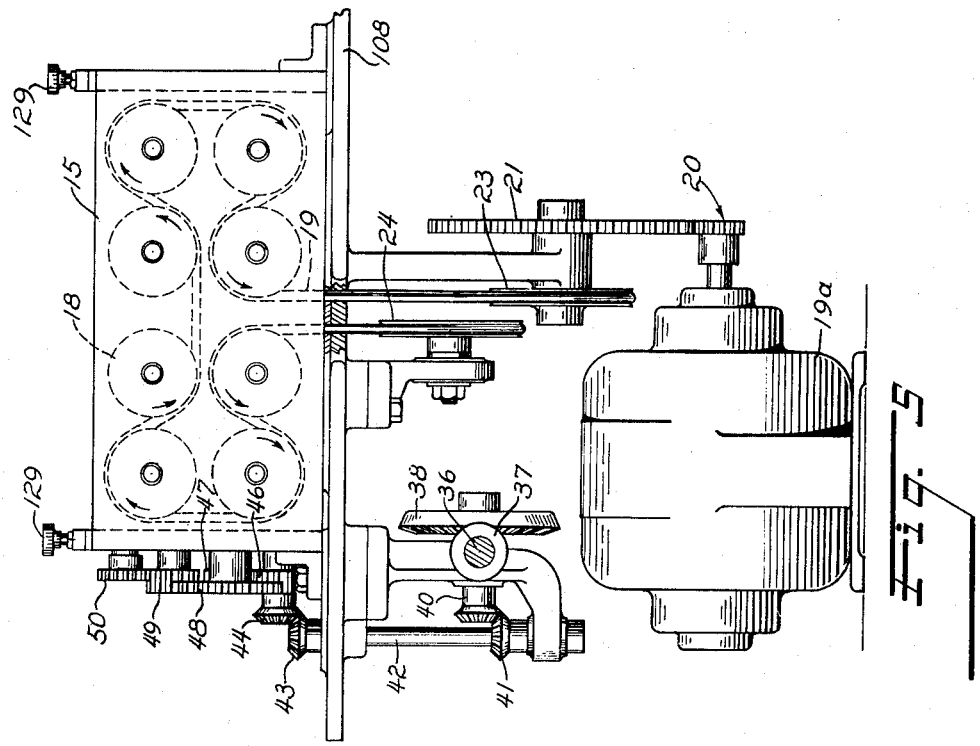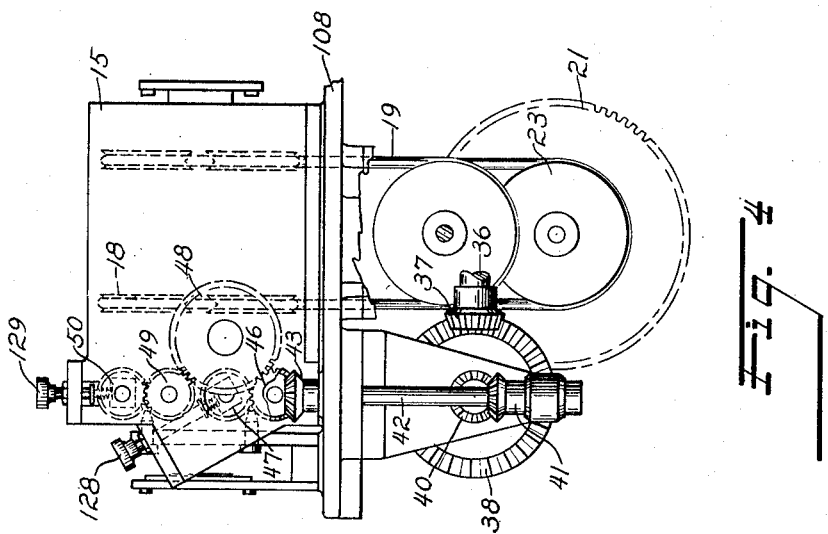

Dec. 14, 1954 R. E. McCOY 2,696,848
RELAY WIRE CONTACT INSERTING MACHINE
Filed Oct. 5, 1949 11 Sheets-Sheet 5
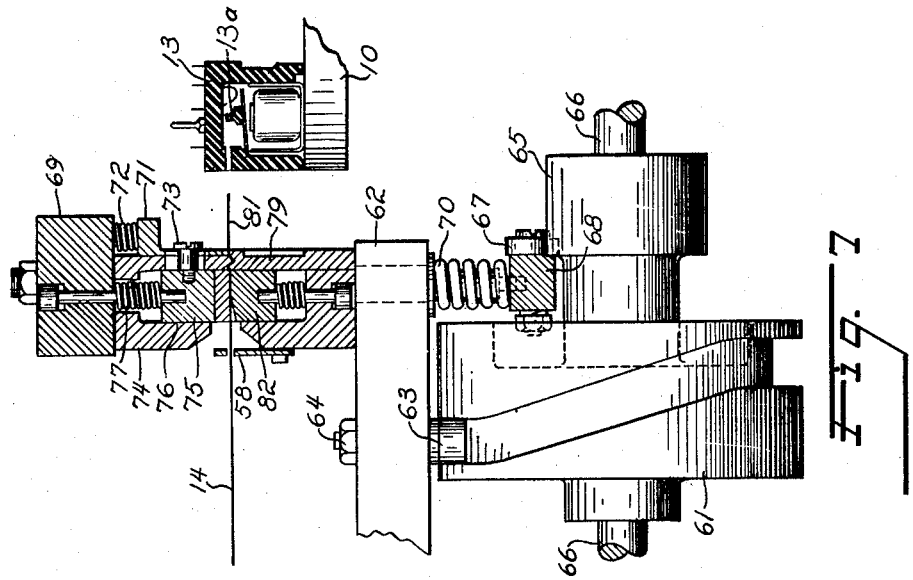
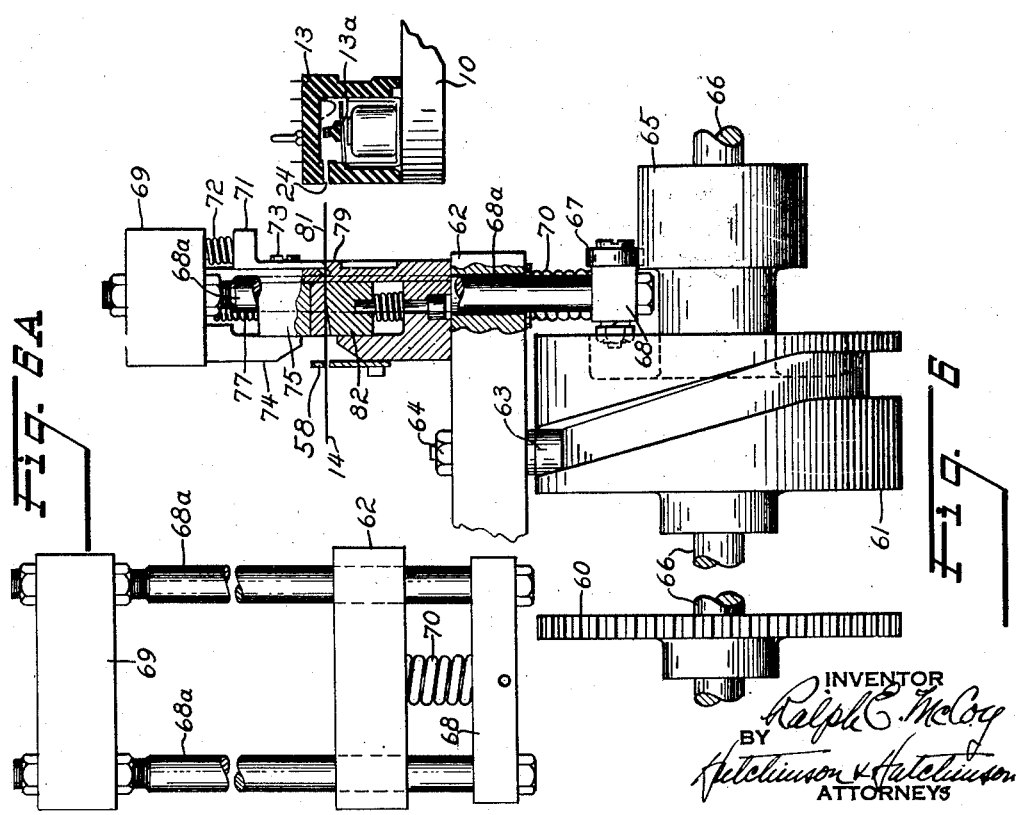
INVENTOR
Ralph E. McCoy
BY
Hutchinson & Hutchinson
ATTORNEYS

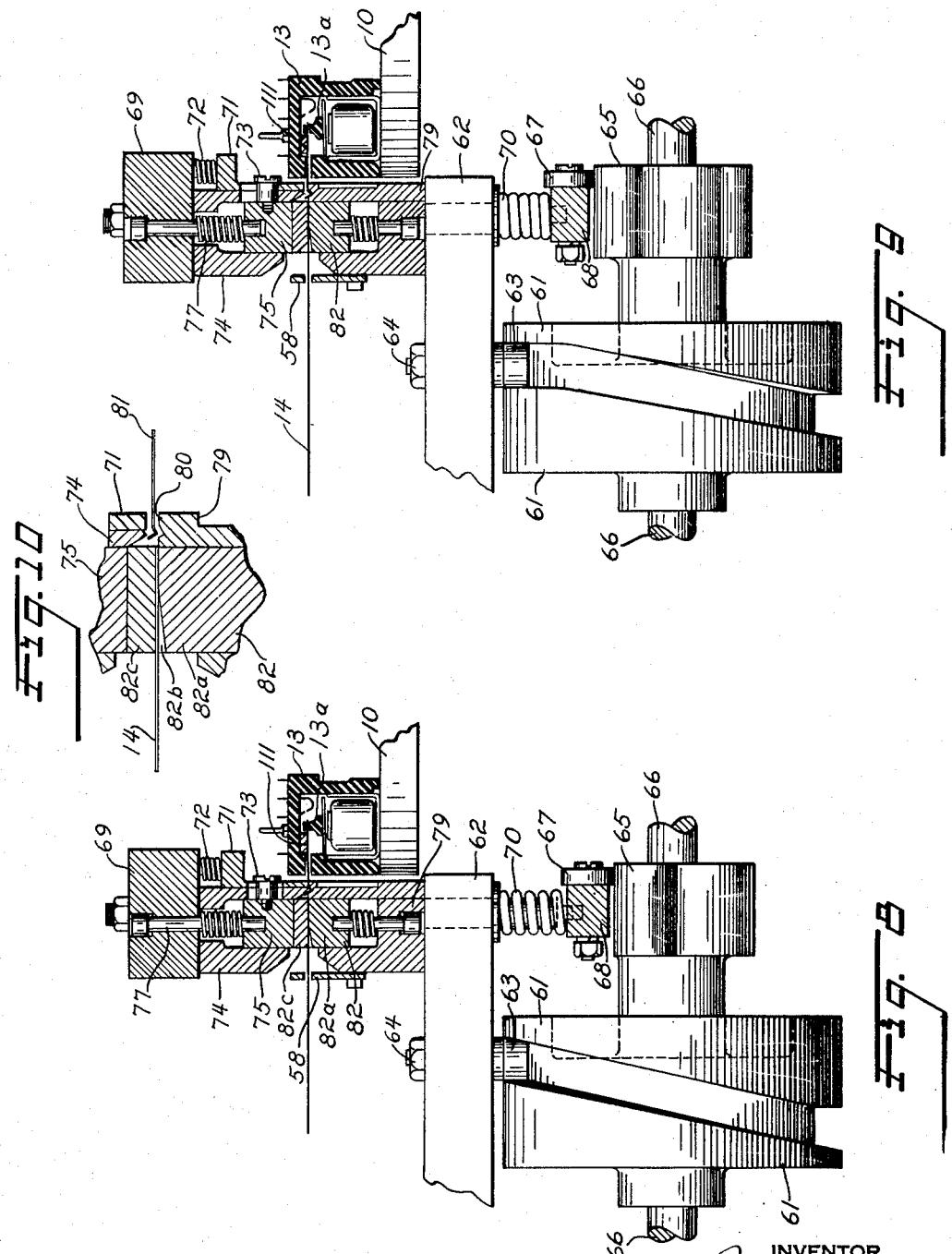

Dec. 14, 1954   R. E. McCOY   2,696,848
RELAY WIRE CONTACT INSERTING MACHINE
Filed Oct. 5, 1949   11 Sheets-Sheet 8

INVENTOR
Ralph E. McCoy
BY
Hutchinson & Hutchinson
ATTORNEYS

Dec. 14, 1954  R. E. McCOY  2,696,848
RELAY WIRE CONTACT INSERTING MACHINE
Filed Oct. 5, 1949  11 Sheets-Sheet 9
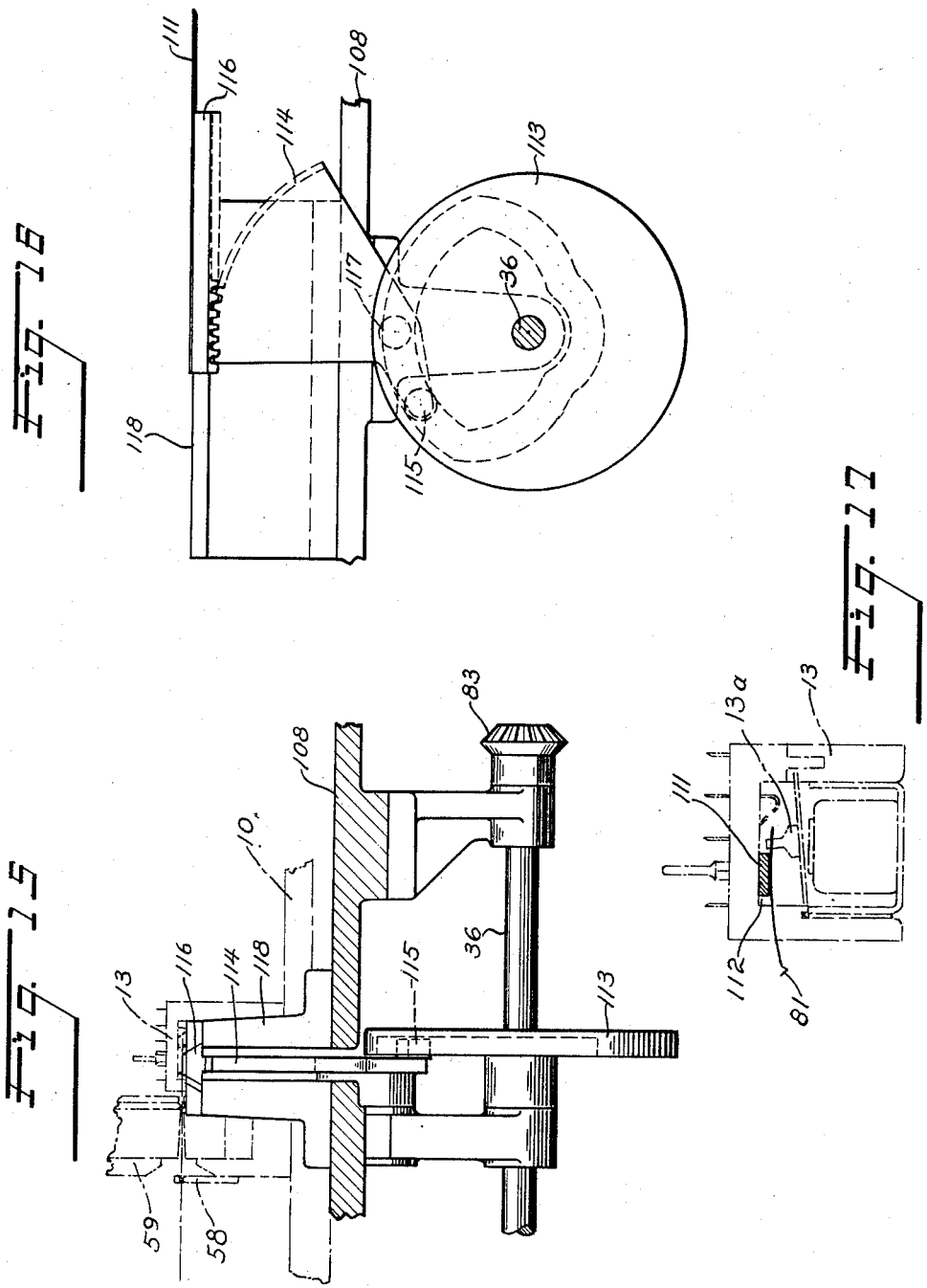
INVENTOR
Ralph E. McCoy
BY
Hutchinson & Hutchinson
ATTORNEYS Dec. 14, 1954   R. E. McCOY   2,696,848
RELAY WIRE CONTACT INSERTING MACHINE
Filed Oct. 5, 1949   11 Sheets-Sheet 10
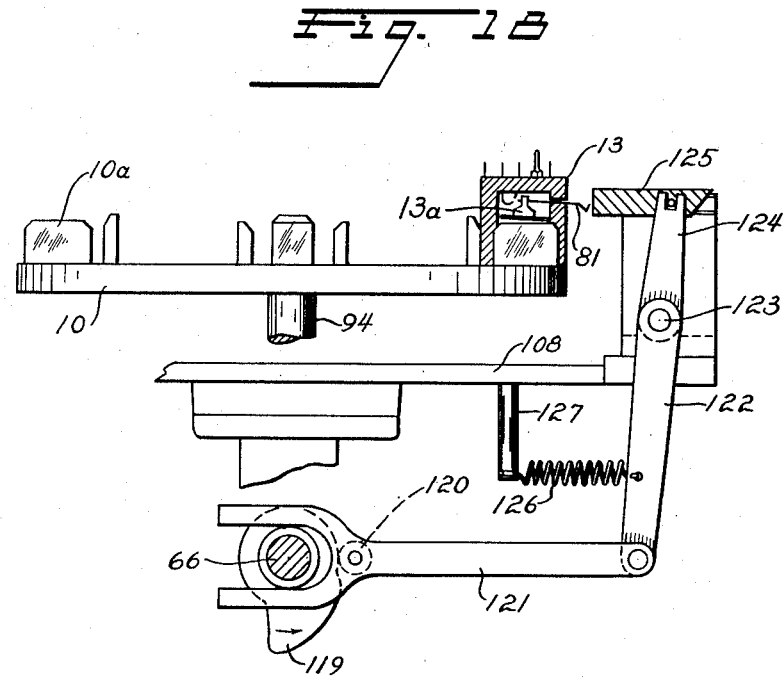
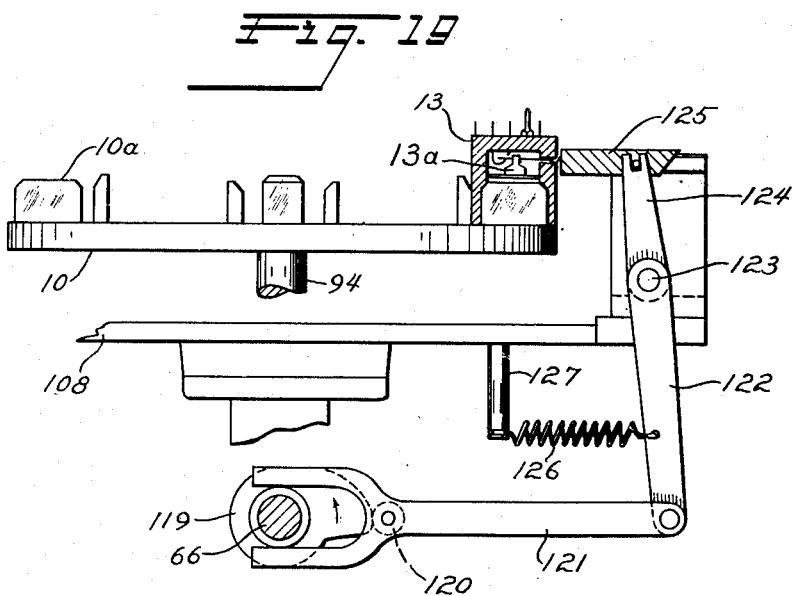
INVENTOR
Ralph E. McCoy
BY
Hutchinson & Hutchinson
ATTORNEYS Dec. 14, 1954 R. E. McCOY 2,696,848
RELAY WIRE CONTACT INSERTING MACHINE
Filed Oct. 5, 1949 11 Sheets-Sheet 11
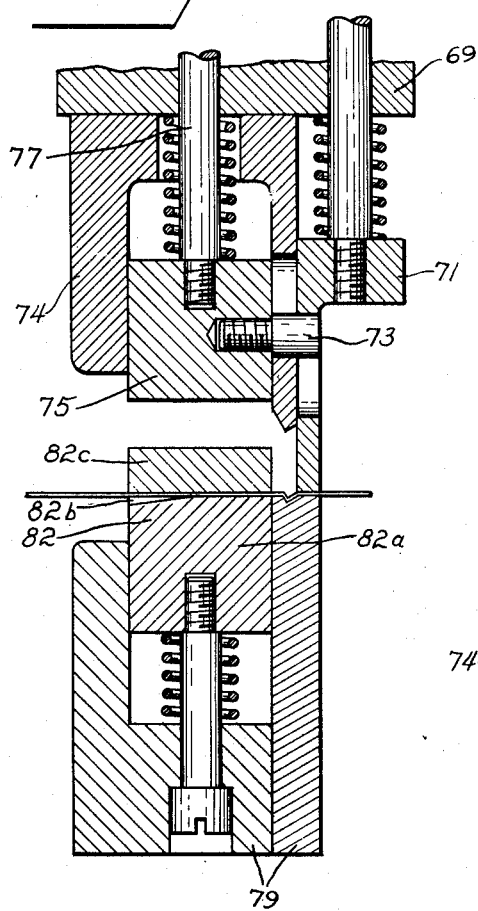
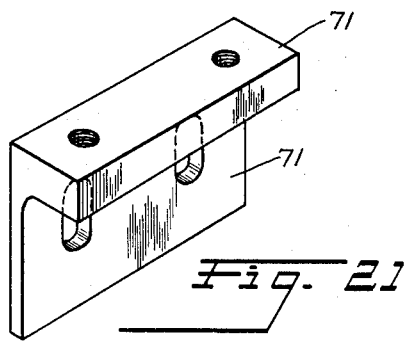
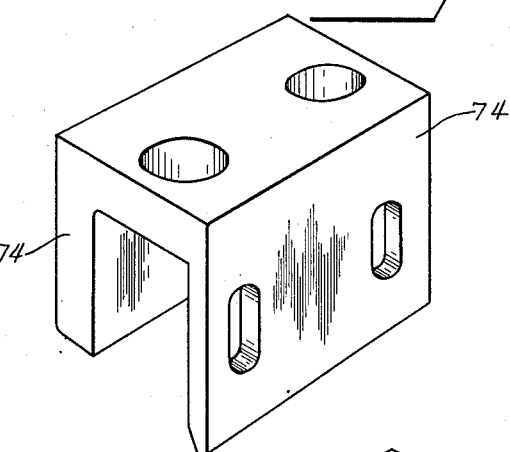
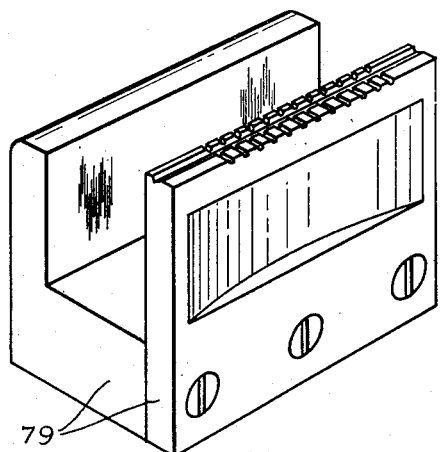
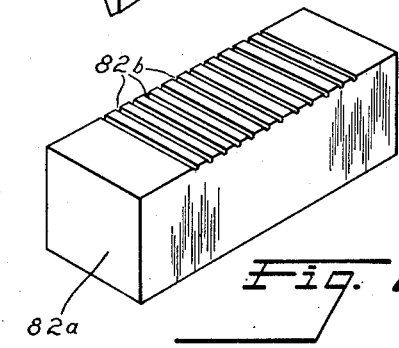
INVENTOR
Ralph E. McCoy
By
Hutchinson & Hutchinson
ATTORNEYS

United States Patent Office 2,696,848
Patented Dec. 14, 1954

2,696,848

RELAY WIRE CONTACT INSERTING MACHINE

Ralph E. McCoy, St. Petersburg, Fla., assignor to International Business Machines Corporation, New York, N. Y., a corporation of New York Application October 5, 1949, Serial No. 119,744

17 Claims. (Cl. 140—1)

This invention relates to a machine for the automatic forming and insertion of wire contacts into relays of the type covered by U. S. Patent to Lake et al. No. 2,282,066.

A machine embodying my invention receives a plurality of strands of wire from storage reels, straightens said strands, cuts therefrom fixed lengths, shapes each individual length of wire and inserts each wire contact so formed into its appropriate position in the relay. The machine comprises a wire supply, a wire straightening device, a forming and shear device, a means for inserting the wire contacts into the relays, a turret to index the relays from a loading position through two work positions to an unloading position, as well as such driving and control means as are necessary to complete the machine.

The principal object of the invention is to provide a machine of the character described which will perform the operations described at a more rapid rate and at a lower cost than has heretofore been possible.

A further object of the invention is to provide a machine of the character described which will produce a product of uniform quality.

Other objects of the invention will be pointed out in the following description and claims and illustrated in the accompanying drawings, which disclose, by way of example, the principle of the invention and the best mode, which has been contemplated, of applying that principle.

In the drawings:

Fig. 2 is a plan view of the principal parts of the machine, minus the wire supply reels.

Fig. 3 is a perspective view of the wire feed and straightening unit.

Fig. 4 is an end elevational view of the wire feeding and straightening unit.

Fig. 5 is a side elevational view of said wire feeding and straightening unit, showing the motor for driving the same.

Fig. 6 is a side elevational view, partly in section, of the forming die and shear assembly and its operating means, and showing the wires fed into position within the assembly and ready for the forming and cutting operation.

Fig. 6A is a detail elevational view of the crosshead guiding means for the forming die and shear mechanism.

Fig. 7 is a side elevational view, partly in section, of the forming die and shear assembly and its operating means, and showing the die parts in position to cut the wires and form the wire contacts, a relay being shown in position to receive the wire contacts.

Fig. 8 is a view similar to Fig. 7, but showing the wire contacts completely formed and partially inserted in the relay.

Fig. 9 is a view similar to Fig. 8, but showing the parts about ready for the lifting of the relay table and indexing thereof, and just prior to the return of the forming die and shear assembly to its normal position as shown in Fig. 6.

Fig. 10 is an enlarged vertical sectional view of the forming die, showing the wire contacts in their cleared position just prior to indexing the relay table.

Fig. 15 is a vertical sectional view showing the filler bar mechanism and its mounting.

Fig. 16 is a side elevational view of the filler bar mechanism.

Fig. 17 is a view of the relay, shown in dotted lines, and with the filler bar shown in the place assumed thereby when guiding the wire contacts to position within the relay.

Fig. 18 is a side elevational view, partly in section, of the pusher mechanism for placing the wire contacts in their final positions within the relay.

Fig. 19 is a view similar to Fig. 18 showing the pushing mechanism at the end of its operative stroke.

Fig. 20 is an enlarged vertical sectional view of the wire forming and cutting assembly.

Fig. 21 is a perspective view of the clamping member for the die assembly.

Fig. 22 is a perspective view of the inverted U-shaped channel section constituting the upper die member for the forming die assembly.

Fig. 23 is a perspective view of the grooved lower section of the lower pressure block for said die assembly, and Fig. 24 is a perspective view of the lower die block of the forming die assembly.

Figure 1:
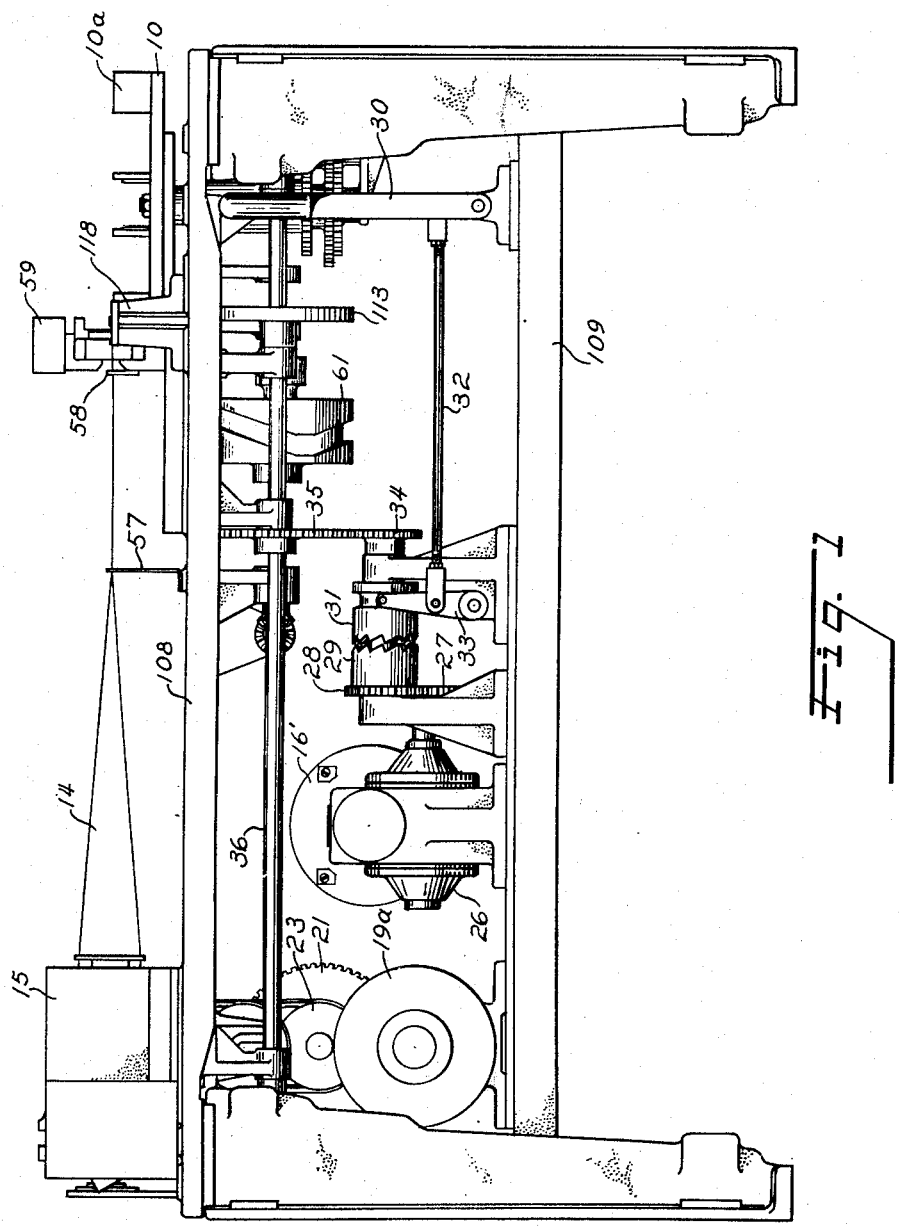
Fig. 1 is a side elevation of the machine.

In Fig. 1 the machine is seen to include an upper bed plate 108 and a lower bed plate 109 spaced and aligned by four corner-disposed legs. Upon the upper bed plate are mounted the wire straightening assembly 15, wire guides 57 and 58, the forming die and shear assembly 59, the trackway 118 for the retractable filler bar guiding means, and the relay positioning table 10. Journalled beneath the upper bed plate are the parallel drive shafts 36 (Fig. 1) and 66 (Fig. 6), which supply the timed relation drives for the machine. The lower bed plate mounts the two electric motor drive units.

The drive

The machine is furnished with two drive motors. One of these motors 16' supplies the drive for all of the mechanically timed elements of the machine. This drive progresses from the motor 16' through the worm gear reduction unit 26 to the gear 27. This gear meshes with and drives gear 28 which is integral with the driving element 29 of a toothed clutch. The driven element 31 of the clutch is slidably keyed to the driven shaft and is positioned by yoke 33 under the control of the operator acting upon lever 30 and transmitting the motion thereof through push rod 32 to the yoke. The driven member of the clutch when positioned to mesh with the driving member carries the drive through the driven shaft to gear 34 which drives gear 35 and thus shaft 36 to which it is fixed. Gear 35 in addition to being a driven gear, drives gear 60 (Fig. 6) and thus shaft 66 to which it is fixed, this shaft being parallel to and in the same horizontal plane as shaft 36.

The left end of shaft 36 drives the feed rolls 16 and 25 of the wire straightening assembly 15. This drive is best shown by the perspective drawing (Fig. 3). The drive from shaft 36 is carried successively through paired bevels 37 and 38, to shaft 39, through paired bevels 40 and 41, to shaft 42, through paired bevels 43 and 44 to the lowermost roller shaft 45. Fixed to shaft 45 is a wide spur gear 46 which meshes with and drives both gear 47 and gear 48. Gear 48, an idler gear, drives gear 49 which drives gear 50. Thus the four first feed rolls are all driven in timed relationship to the balance of the machine. The second set of feed rolls are powered through shaft 45, paired bevels 51 and 52, shaft 53, paired bevels 54 and 55 to layer roller shaft 56. Here the drive to the balance of the rolls is the duplicate of that for the first rolls including gears 46, 47, 48, 49 and 50. The gearing in this mechanism governs the speed of the feed rolls 16 and 25 (Fig. 3) so that the wires are fed at a much slower rate than the rest of the machine is turning. For each revolution the feed rolls make, the wires travel 1.1875 inches. The gearing has a 3–1 ratio.

Wire straightening device

The straightening device as shown in Fig. 3 is seen to consist of the first and second set of feed rolls, 16 and 25 respectively, the drive for which has just been traced, and eight wire straightening roll assemblies. The straightening rolls 17 are disposed in a staggered arrangement so that the wire passing tangent to said rolls describes a zig-zag path. In addition the rolls and their mount are rotated about the axis of the wire by the pulleys 18 cooperating with belt 19, so that the wire is straightened on all axes.

The rotating straightening roll assemblies are driven by a single belt 19 passing seriatim over all pulleys and driven by the pulley 23 (Fig. 5) which in turn is driven from the motor 19a through a motor pinion 20 to gear 21 which is fixed to a shaft common to pulley 23. In this connection, the pulley 23 (Fig. 5) drives the belt 19 around all of the pulleys 18 and back around another pulley 24, thus causing the belt to make a continuous run through all of the pulleys 18.

Through this operation of the turning of the straightening roll assemblies, the wires are rolled on all sides, thus straightening said wires in every way. After leaving the straightening roll assemblies the wires enter the second set of feed rolls 25 which pull the wires 14 through the straightening units and at the same time keep the wires taut.

It will also be noted that in Figs. 4 and 5 illustrating the wire straightening unit, the feed rolls 16 may be adjusted by knobs 128 and 129, this being standard practice on such machines.

Forming die and shear assembly

After the wires have been straightened they travel through two guides 57 and 58 (Fig. 1) and into the forming die and shear assembly indicated at 59 in Fig. 1.

The forming die and shear assembly 59 (Fig. 1) forms, shears, and partially inserts the wire contacts into the relays. The action is under the control of two cams 61 and 65 on the shaft 66 (Fig. 6), the drive for which has previously been traced.

The assembly is slidably mounted in guideways fixed to the upper bed plate 108 (Fig. 1) and is controlled in its horizontal movement by the roller 63 (Fig. 6) coacting with the cylindrical cam 61. The movement of the dies is controlled by roller 67 coacting with plate cam 65. Said roller is rotatably mounted centrally on crosshead 68 (Fig. 6A), which crosshead has fixed thereto cylindrical pillars 68a terminated at their other extremity by crosshead 69. The crosshead and pillar assembly is guided by sleeves in the assembly base plate 62 which slides in the guideways previously mentioned. Compressed between base plate 62 and crosshead 68, is the spring 70 which powers the closing of the die when permitted by cam 65.

The die construction (Fig. 8) shows the channel section 74 fixably mounted to the crosshead 69 and thus moved directly by cam 65. Said channel section has a shaped right leg which is the male component of the forming die. Slidably mounted within channel 74 is a spring-loaded (spring 77') block 75 which is restricted in its spring-urged downward movement relative to channel 74 by headed stud 77 bottoming in a counterbored hole in crosshead 69. Slidably mounted with respect to channel 74, and guided by studs 73 sliding in elongated holes, is spring urged angle section 71 which serves as a wire clamp.

The bottom portion of the die is comprised of the built-up channel section 79 which has a shaped right leg which is the female component of the forming die. Sliding within this channel section is the block 82 which is upwardly spring urged, but limited by a headed stop bottoming in a counterbored hole in channel section 79. The block 82 is composed of a lower block 82a topped with parallel wire containing grooves 82b, and an upper or shear block 82c rigidly fixed together, which rigid sectional block 82 is tensioned by spring 82d and thereby urged upwardly to a limited extent as indicated above. As will be noted particularly by reference to Fig. 20, the wire stock is fed between the two sections 82a and 82c of block 82, and obviously said wire stock during its feed through said block 82 is received within and guided by the grooves 82b.

Also the upper surface of the female die member (right leg of channel section 79) is topped with parallel wire containing grooves 79a (see Fig. 24), said grooves being in line with the wire containing grooves 82b to which reference has just been made.

With the cam roller 67 resting upon the highest point of cam 65, the die (right leg of member 74 and right leg of member 79) will be in its most opened position and with the pressure block 75 and the clamp 71, each individually spring urged, being in the most downward position relative to the channel 74. So disposed, the pressure block 75 will be clear of the lower block 82, and the clamping member 71 will be sufficiently removed from the cooperating surface of channel member 79 to allow retraction of a previously formed wire and insertion of a new length of wire.

As the cam 65 rotates, shorter radii are successively presented to the roller 67, and spring 70 causes the crosshead assembly to follow the cam and thus to lower. As a result of this lowering clamping member 71 first meets the mating member of the lower die to clamp the newly inserted wires in place. Following this pressure block 75 meets with block 82 causing it to move downward to shear the wire between the corners of shear block 82c and the right leg of channel section 79. Following this the shaped leg of channel section 74 (the upper male die member) meets the wire and forms it into the complementary contour of the lower die block 79 (the female die member) of the forming die assembly. Following this the cam 65 positively raises the crosshead assembly to release the formed wires and to thus complete the cycle.

The complete operation of the forming die and shear assembly may now be had by reference particularly to Figs. 6, 7, 8 and 9. After the wires pass through the last wire guide 58, they enter the die and shear assembly, the wire contacts being formed in the manner heretofore described, and from which assembly said formed wire contacts are transferred to and partially inserted into the relays, as will be hereinafter more fully set forth.

By referring to Fig. 6, it will be noted that the die and shear assembly is shown in its normal position where the wire 14 has been fed into position and is ready for the operation of forming, cutting and partially inserting a wire contact (after completely formed) into a relay 13. The complete operation is as follows: The gear 60 which is driven from the gear 35 on the main drive shaft 36, rotates the cam 61, both gear 60 and cam 61 being keyed to the cam shaft 66. This cam 61 has a cam groove around its periphery serving to drive the assembly base plate 62 in a forward and backward stroke during the operation of the machine, it being noted that a roller 63 is attached to the plate 62 at 64 and so mounted for travel within said cam groove to provide for the forward and backward stroke just mentioned. As heretofore described, a second cam 65, keyed to shaft 66, directs the opening and closing of the die and shear mechanism by means of roller 67 which rides upon the outside face of said cam.

In Fig. 6, the cam 65 has started its downward turn and the wire clamp 71 has gripped the wire as the cam 61 starts its dwell. This wire clamp 71 is tensioned by spirng 72 and guided by studs 73 as heretofore described.

In Fig. 7, the cam 65 has moved to a lower position permitting the channel section 74 (male die of the wire shaper) to lower for the purpose of meeting the female die member to shape one end of the contact wire being formed. At the same time the wire shear block 82 has been forced down by the spring block 75, tensioned by spring 77', thus cutting the wire 14 between the corners of shear block 82c and channel section 79 as the end of the wire contact is shaped. Furthermore, at this time cam 61 has moved past the dwell and is ready to start functioning as a means for accomplishing the forward stroke of the die and shear assembly.

In Fig. 8, the wire has been cut and wire contact 81 completely formed and partially inserted into the relay 13, the cam 61 having completed its forward stroke function and the cam 65 having reached its lowest level.

In Fig. 9, the cam 65 has turned to its high spot, while the cam 61 is dwelling in its long dwell. At this point in the operation of the machine, the wire contact 81 is released and a clearance maintained for the wire contact to pull clear of the die and shear assembly.

This is better seen in Fig. 10, which is blown up for better visibility. The wire contact 81 having been completely formed and partially inserted in the relay, the table 10 which supports the relays 13, is first lifted to clear the wire contact from the die and shear assembly and then the table 10 indexes 90° to the next position in a manner and for the purpose to be hereinafter explained more in detail. As the table 10 indexes, the die and shear assembly starts its backward stroke and thus feeds more wire for the forming of the wire contacts for the next relay. This is what might be called a threading operation for the purpose of projecting a suitable length of the wire stock in a forward direction beyond the die and shear assembly (as shown for instance in Fig. 6) which length of wire (the free end portion of the wire stock) is to be formed into other wire contacts for the relay assemblies, as will be obvious. This threading operation is brought about irrespective of the normal feed of the wire stock to the die and shear assembly.

At this point, it is desired to call attention to the fact that as the die and shear assembly receives its forward stroke for partially inserting the wire contacts, said wire contacts 81 pass through openings at 24 in the left leg of the relay molding 13 and through other openings which can be seen in the relay itself, including openings in the cross bar 13ᵃ on the armature for said relay (see Fig. 17). At this time the wire contacts are most of the way in toward their final positions, suitable mechanism, to be described hereinafter, being provided for pushing the wire contacts to their final positions within their respective relays.

Table indexing mechanism

Figure 11:
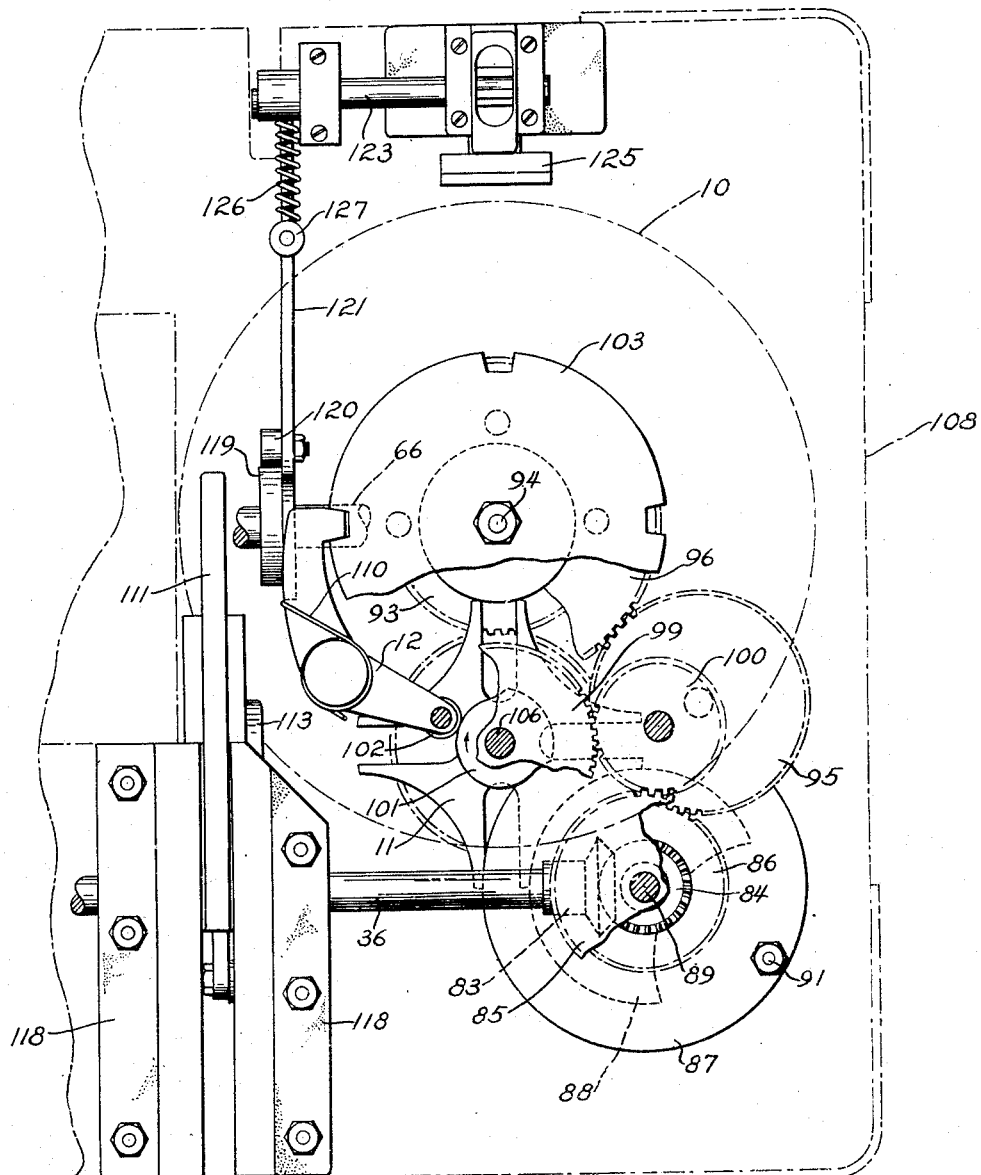
Fig. 11 is a plan view showing the table indexing mechanism, and also the filler bar and guiding means therefor.

Reference has been made to the fact that the relays are mounted on a table which rotates 90° each cycle of operation. The mechanism for accomplishing this purpose is disclosed in Figs. 11, 12, 13 and 14, and the operation in this connection may be set forth as follows: The main drive shaft 36 has a bevel gear at 83 (Figs. 11 and 12) which in turn drives a bevel gear 84, two gears 85 and 86 and a disc 87 with a half moon 88 fastened to it. These all rotate with shaft 89 to which they are fastened. The disc 87 has a roller 90 mounted at 91 which engages the Geneva drive 11 once on every 90° turn. As the Geneva 11 is driven, it rotates a gear 92 which is driving a gear 93 which is fastened to the shaft 94 upon which the table 10 is mounted.

Each time the Geneva drive makes a quarter or 90° turn, the table, through the shaft 94, does likewise. At the same time as all this is happening, however, a gear 95 driven by gear 86 is driving a free running gear arrangement 96. This free running gear 96 carries two rollers 105 around that ride against a lifting cam 97 which lifts the table to clear the relay wire contact as has been explained heretofore. A spring 98 gives the tension to the table so that it will return to its original position.

Figure 12:
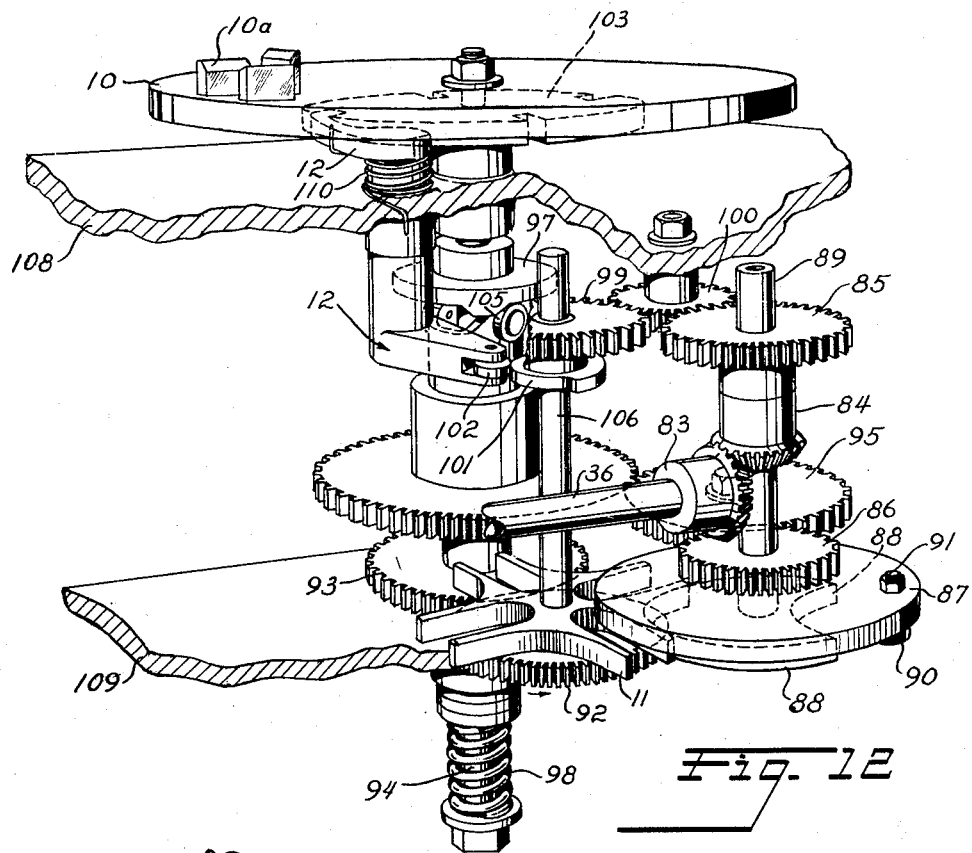
Fig. 12 is a perspective view of the table indexing mechanism.
Figure 13:
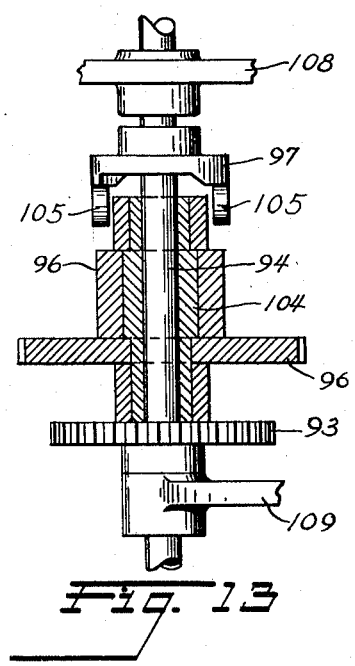
Fig. 13 is a detail sectional view of the shaft upon which the relay table is mounted, and also certain of the operative parts as carried by said shaft.
Figure 14:
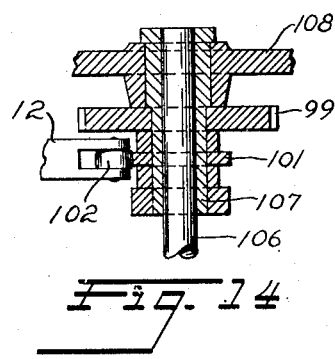
Fig. 14 is a detail sectional view of the shaft carrying the gear and cam assembly for intermittently locking the relay table from turning.

Another free running gear and cam arrangement 99 is operated from the shaft 89 through the gearing of gear 85 driving gear 100 and this in turn driving the cam and gear arrangement 99—101. As the cam 101 turns or rotates, a high spot forces an arm 12 via a roller 102 which pulls the arm 12 out of the notched plate 103 freeing it to turn 90°. In Fig. 13, the free running gear 96 is illustrated showing the bushing 104 riding with freedom on the shaft 94. This gear assembly 96 has two rollers 105 which ride on the bottom of cam 97 to lift the table. The gear 93 drives the shaft 94. Fig. 14 shows the gear and cam assembly which also runs freely on the shaft 106 through a bushing 107. The main frame 108 supports all of the mechanism on the top and frame 109 supports it on the bottom. The latch arm 12 is tensioned by a spring 110 (Fig. 12).

Wire contact guiding mechanism

It has been set forth herein that after the wire contacts have been completely formed, they are partially inserted within the relay assembly 13. To assist in guiding said contact wires into the relay assembly and to their preliminary positions within said relay assembly, a filler bar 111 is moved into the space 112 below the top of the relay frame and just prior to threading the wire contacts into the relay assembly—see particularly Fig. 17. Of course as will be obvious this filler bar 111 is moved in timed relation to the other mechanisms which have been described herein.

The timed operating mechanism for reciprocating the filler bar or guiding means 111 to its operative and inoperative positions, will now be described, and in this connection, see particularly Figs. 2, 15, 16 and 17.

The filler bar 111 is reciprocated by a cam and rack arrangement in the following manner: Keyed to and driven by the main drive shaft 36 is a cam element 113, which in the present disclosure is a grooved plate cam located for operation directly beneath the upper bed plate 108. Pivotally mounted directly below the upper bed plate 108, and projecting through a slot in said bed plate, is a toothed segment member 114, said toothed segment being pivoted at 117 and carrying at a point below the bed plate 109, a roller 115 which rides within the cam groove of said cam element 113. See particularly Figs. 15 and 16. Meshing with the toothed segment member 114 is a toothed rack 116, which in turn is mounted for sliding movement upon a trackway 118 located upon the bed plate 108. The toothed rack 116 has mounted at its forward end the filler bar 111. As will be obvious, as the cam element 113 rotates, the roller 115 rides within the cam groove of said cam element, and thereby rocks back and forth toothed segment 114 upon its pivot 117. The toothed segment 114 being in mesh with the toothed rack 116, said rack is reciprocated back and forth and along with it the filler bar 111 which is mounted to move with said rack. As has been stated, the filler bar mechanism is operated in timed relation to other mechanisms and therefore presents the filler bar to a relay assembly at the time said relay assembly is in proper position for receiving the wire contacts.

Wire contact pusher mechanism

As has been briefly indicated herein, the wire contacts after being inserted to their preliminary positions within the relay assembly, are moved to their final positions within the relay assembly when it arrives at its work position for such purpose. In this connection, it is to be noted that the relay assemblies which are positioned in the manner heretofore described upon the indexed rotating table 10, have two work positions upon each complete revolution of the table 10. The first of these two work positions is that where the relay assemblies first receive the wire contact for receiving the same and partially locating them within the relay assemblies, all of which has been fully described herein.

At the second work position of the relay assemblies, is located adjacent thereto, a pusher mechanism which is adapted to place the wire contacts in their final positions within the assemblies. See in this connection particularly Figs. 2, 18 and 19. Referring to Figs. 18 and 19, it will be noted that a cam 119 is mounted for rotation upon shaft 66 which is driven from the main drive shaft 36 through gearing heretofore described, and said cam 119 traveling in the direction indicated by arrow, pushes against a roller 120 which in turn drives the arm 121 forward, thus rocking arm 122 (which is pivoted at one end to arm 121), upon its pivot 123. The arm 122 is mounted for pivotal movement upon the upper bed plate 108, and in this connection the relatively short portion of said arm 122 projecting upwardly above said pivot 123, is suitably attached at its upper free end to a pusher block 125, which in turn is slidably mounted upon the support to which arm 122 is pivoted. It will be obvious that as the arm 122 is rocked upon its pivot 123 by the cam arrangement just described, the pusher block 125 will be reciprocated back and forth, and upon its forward movement toward the relay assembly (which has arrived at the second work position referred to above), will engage the free ends of the wire contacts thus moving said wire contacts to their final positions within said relay assembly.

It will be noted that the arm 122 is tensioned by a spring 126, said spring being connected at one end to the lower portion of the arm 122, and at its other end connected to a stud 127 projecting below the upper bed plate 108. Fig. 18 shows the pusher block at the end of its backward stroke and in position to start its operative stroke, the cam roller 120 at this time resting upon the low face of cam 119. The cam 119 then starts to function to bring about the operative stroke of the pusher block 125 in the manner heretofore described, and in this connection Fig. 19 shows the pusher block at the end of its operative stroke and with the wire contacts in their final positions within the relay assembly.

What I claim is:

1. In a machine for shaping and inserting wire contacts in place within electromagnetic relays and where said wire contacts are to be used as elements of said relays, a shaping assembly mounted as a unit for reciprocating movement, means including an element attached to said shaping assembly for reciprocating the same, means for feeding wire stock to said assembly, die means carried by said assembly for shaping the wire contacts, shear means also carried by the assembly for severing the wire contacts as formed from the fed wire stock, means for bodily moving after each forming operation the shaping assembly in a forward direction toward an adjacently supported relay unit for inserting the wire contacts so formed and severed in operative positions within said relay unit, means for maintaining the relay unit in fixed position relative to the shaping assembly during the inserting operation, means for maintaining the formed and severed wire contacts in held relation with the shaping assembly during the inserting operation, and means for releasing said wire contacts from their held relation with the shaping assembly after the inserting operation and prior to the return stroke of the shaping assembly.

2. In a machine for shaping and inserting wire contacts in place within electromagnetic relays, a shaping assembly mounted for reciprocatory movement, means for feeding wire stock to said assembly, means carried by the assembly to clamp the fed wire stock in fixed relation with said assembly, die means carried by said assembly for shaping the free end portion of the wire stock so held to form wire contacts, shear means also carried by the assembly for severing the wire contacts as formed from the fed wire stock, a rotary index table for supporting relay units thereon and in spaced relation to the shaping assembly, means for rotating said index table by steps to successive index positions to locate each relay unit supported thereon one after another in alignment with the said assembly and in a rest inserting position for receiving the formed wire contacts directly from the shaping assembly, said last mentioned means being operated in timed relation to the operations of said shaping assembly, means operated after each forming and severing operation for reciprocating said assembly toward each relay unit upon arrival at such rest inserting position for inserting the formed wire contacts into positions within each relay in regular succession, each set of wire contacts when formed and severed being still gripped by the clamping means of said assembly during each operative stroke of the assembly to thus facilitate the inserting operation, and means for releasing the wire contacts from the assembly after the completion of the inserting operation and prior to the return stroke of the assembly.

3. In a machine for shaping and inserting wire contacts in place within electromagnetic relays, a shaping assembly mounted for reciprocatory movement, means for feeding wire stock to said assembly, means carried by the assembly to clamp the fed wire stock in fixed relation thereto, die means carried by said assembly for shaping the free end portion of the wire stock so held to form wire contacts, shear means also carried by the assembly for severing the wire contacts as formed from the fed wire stock, a rotary index table for supporting relay units thereon and in spaced relation to the assembly, means for rotating said index table by steps to successive index positions to locate each relay unit supported thereon one after another in alignment with the shaping assembly and in a rest inserting position for receiving the formed and severed wire contacts directly from the shaping assembly, means for moving said assembly while in clamping relation with the wire contacts so formed and severed to partially insert said wire contacts in each relay unit upon arrival at its inserting index position, means to release the wire contacts from the shaping assembly after the completion of the partial inserting operation, and means supported at another index position of said relay units for thereafter placing said wire contacts in their final operative positions within each relay unit upon arrival at said last mentioned index position.

4. In a machine for shaping and inserting wire contacts in place within electromagnetic relays, a shaping assembly mounted for reciprocatory movement, means for feeding wire stock to said assembly, means carried by the assembly to clamp the fed wire stock in fixed relation thereto, die means carried by said assembly for shaping the free end portion of the wire stock so held to form wire contacts, shear means also carried by the assembly for severing the wire contacts as formed from the fed wire stock, a rotary index table for supporting relay units thereon and in spaced relation to the shaping assembly, means for rotating said index table by steps to successive index positions to locate each relay unit supported thereon one after another in alignment with said assembly and in a rest inserting position for receiving the formed and severed wire contacts directly from the shaping assembly, means for moving said assembly while in clamping relation with the wire contacts so formed and severed to partially insert said wire contacts in each relay unit upon arrival at its inserting index position, means to release the wire contacts from clamped relation with the assembly after the completion of the partial inserting operation, pusher means mounted for reciprocatory movement at another index position of said relay units, said pusher means adapted to engage the free ends of the partially inserted wire contacts of each relay unit upon assuming a period of rest at said last mentioned index position, and means for reciprocating said pusher means while engaged with the wire contacts for placing the wire contacts in their relatively final positions within each relay unit during said period of rest of each relay unit.

5. In a machine for forming and inserting electrical wire contacts in place within electromagnetic relays, a rotary index member having a plurality of spaced supports for holding relay units, means for rotating said index member by steps to successive index positions whereby the relay units supported thereby are indexed from a loading position to a wire contact inserting index position, a shaping assembly mounted for reciprocatory movement, means for timing the movement of said index member in relation to the reciprocating movement of the shaping assembly, wire supply means comprising means to feed wire stock to said shaping assembly, means carried by said shaping assembly to form and sever wire contact members from the wire stock as fed to said assembly and in the intervals between the steps of rotation of said index member, means for maintaining the formed wire contacts in held relation to the shaping assembly during an inserting operation, means for reciprocating the shaping assembly with the wire contact members so formed and severed held thereby for inserting said wire contact members in place in each relay unit upon arrival at the inserting index position of the index member, and means for releasing the formed and severed wire contacts from their held relation with the shaping assembly immediately after the completion of the inserting operation and prior to the return reciprocating stroke of the shaping assembly for its next forming and inserting operation.

6. In a machine for shaping and inserting wire contacts in place within electromagnetic relays, a shaping assembly adapted for reciprocatory movement, means for feeding wire stock to said assembly, means carried by the assembly to clamp the wire stock in fixed relation thereto, die means carried by said assembly for shaping the free end portions of the wire stock so held to form wire contacts, shear means also carried by the assembly for severing the wire contacts as formed from the fed wire stock, a rotary index table for supporting relay units thereon and in spaced relation to the shaping assembly, means for rotating said index table by steps to successive index positions to locate each relay unit supported thereon one after another in alignment with said assembly and in a rest inserting position for receiving the formed and severed wire contacts directly from the shaping assembly, means for moving the shaping assembly in a direction toward each relay unit upon arrival at the inserting position and while said assembly is in clamping relation with the wire contacts so formed and severed for partially inserting said wire contacts in each relay unit upon arrival at its inserting index position, means to release the wire contacts from the shaping assembly, and intermittently operated reciprocating pusher means mounted for action at another index position of the relay units and adapted to engage the free ends of the partially inserted wire contacts for moving the same to their final positions with relation to the relay units.

7. In a machine for shaping and inserting wire contacts in place within electromagnetic relays, a shaping assembly adapted for reciprocatory movement, means for feeding wire stock to said assembly, means carried by the assembly to clamp the wire stock in fixed relation thereto, die means carried by said assembly for shaping the free end portion of the wire stock so held to form wire contacts, shear means also carried by the assembly for severing the wire contacts as formed from the fed wire stock, a rotary index table for supporting relay units thereon and in spaced relation to the shaping assembly, means for rotating said index table by steps to successive index positions in timed relation to the shaping and shearing operations and to locate each relay unit supported thereon one after another in alignment with the assembly and in a rest inserting position for receiving the formed and severed wire contacts, means for intermittently reciprocating the shaping assembly toward each relay unit when brought into such aligned and rest position for inserting the wire contacts as formed within each relay in regular succession, each set of wire contacts when formed and severed being still gripped by the clamping means of the shaping assembly during each operative stroke of said assembly to facilitate the inserting operation, means for releasing the clamping means after the inserting operation, and means for lifting the rotary index table to clear the wire contacts from engagement with the shaping assembly after the completion of the inserting operation and prior to the return stroke of said assembly.

8. In a machine for shaping and inserting wire contacts in place within electromagnetic relays, including a shaping assembly for forming wire contacts, means for supporting and intermittently moving a series of relay units in regular succession and in timed relation to the forming operation to position each relay unit in turn in a rest inserting position adjacent the shaping assembly for receiving directly from said assembly the wire contacts as formed, means including an element attached to the shaping assembly for moving the same toward a relay unit for inserting the formed wire contacts in place within each relay unit after arriving at its rest inserting position, and wire contact guiding means supported adjacent the relay unit rest inserting position and including a filler bar adapted to be intermittently moved to a position within each relay unit after its arrival at said inserting position and prior to and in timed relation with the inserting operation, said filler bar remaining within each relay unit only during its period of rest, whereby said wire contacts during the inserting operation are guided by said filler bar to their proper positions within each relay unit in regular succession.

9. In a machine for shaping and inserting wire contacts in place within electromagnetic relays, including means for forming wire contacts, means for supporting a series of relay units and including an element for moving said relay units one at a time to a rest position with relation to the forming means, means for inserting the formed wire contacts in place within a relay unit upon arrival at its rest position, and wire contact guiding means supported adjacent the rest inserting position of a relay unit and including an intermittently reciprocated filler bar which upon completing its operative stroke toward a relay unit at such rest inserting position momentarily assumes a relatively fixed wire contact guiding position within said relay unit and only during its period of rest at the wire contact inserting position, said filler bar when assuming such position within each relay unit in regular succession, serving to positively guide the wire contacts to their correct positions within each relay unit and during each operation of the wire contact inserting means.

10. In a machine for shaping and inserting wire contacts in place within electromagnetic relays, including means for forming wire contacts, means for supporting a series of relay units and including means cooperating therewith for moving said relay units in regular succession to a rest inserting position adjacent the forming means and in timed relation to the forming operation, means for inserting the formed wire contacts in place within each relay unit upon arrival at its rest inserting position, wire contact guiding means supported adjacent the rest position assumed by each relay and adapted for cooperative relation with each relay upon arrival at said rest position, said guiding means including a filler-bar intermittently reciprocated to a position within said relay unit prior to the inserting operation and serving when in such position to guide the wire contacts to their proper positions within each relay unit during the inserting operation, and rack and pinion means for intermittently reciprocating the filler-bar guiding element from a position removed from a relay unit when in its rest inserting position to a position within said relay unit and where said filler bar is momentarily held in fixed relation to said relay unit and only for its period of rest for the wire contact inserting operation.

11. In a machine for forming and inserting electrical contacts in place within electromagnetic relays, a shaping assembly adapted for reciprocatory movement, means for feeding wire stock to said assembly, means carried by the assembly to clamp the wire stock in fixed relation thereto, die means carried by said assembly for shaping the free end portion of the wire stock so held to form wire contacts, shear means carried by said assembly for severing from the wire stock the wire contacts so formed, means for supporting a number of relay units, means associated with said supporting means for moving said relay units in regular succession to a predetermined rest position with respect to the shaping assembly for receiving the wire contacts directly from said assembly as formed, means for intermittently moving the shaping assembly in a forward direction toward each relay unit upon arrival of a relay unit at its rest position for inserting the wire contacts so formed within said relay unit, means for temporarily maintaining the formed and severed wire contacts in their clamped relation with the shaping assembly during the inserting operation, said wire stock still being maintained within the shaping assembly for subsequent and continued feed in the forming of additional contact wires from said wire stock, and means for releasing the wire contacts from their clamped relation with the shaping assembly after the completion of the inserting operation and prior to the return stroke of the shaping assembly, said wire stock being threaded through the shaping assembly during the return stroke of said assembly to thereby project the free end portion of the said wire stock for a suitable length beyond the assembly to thereby permit adequate wire stock for the shaping of additional wire contacts.

12. In a machine for shaping and inserting wire contacts in place within electromagnetic relays, a shaping assembly adapted for reciprocatory movement, means for feeding wire stock to said assembly, die means carried by said assembly for shaping the wire stock to form wire contacts, shear means also carried by the assembly for severing the wire contacts as formed from the fed wire stock, means for supporting a number of relay units, said supporting means including an element operatively associated therewith for moving the relay units in regular succession and in timed relation with the wire contact forming and shearing operations and to a predetermined position with respect to the shaping assembly for receiving therefrom the wire contacts as formed, spring tensioning means for the several die and shear assembly elements, cam operated means for permitting the die and shear assembly elements to be moved in timed relation one with respect to the other for performing their functions, and cam operated means for intermittently moving the shaping assembly as a unit with respect to each relay unit upon arrival at said predetermined receiving position for placing the wire contacts as formed within said relay unit and directly from said shaping assembly.

13. In a machine for shaping and inserting wire contacts in place within electromagnetic relays, a shaping assembly adapted for reciprocatory movement, means for feeding wire stock to said assembly, die means carried by said assembly for shaping the wire stock to form wire contacts, shear means also carried by the assembly for severing the wire stock as formed from the fed wire stock, means for supporting a number of relay units, means including an element associated with said supporting means for moving said relay units in regular succession to a predetermined position with respect to the shaping asembly for receiving the wire contacts as formed, spring tensioning means for the several die and shear assembly elements, cam operated means for permitting the die and shear assembly elements to be moved in timed relation one with respect to the other for performing their functions, and cam operated means for intermittently moving the shaping assembly with the formed and severed wire contacts held thereby in a forward direction toward each relay unit upon its arrival at said predetermined receiving position for inserting the wire contacts as formed within said relay units, said cam means permitting a dwell of the shaping assembly at the end of the forward stroke of the assembly to permit proper release of the wire contacts from said assembly upon completion of the inserting operation, and said cam means also permitting a dwell of the shaping assembly at the end of the return stroke of said assembly to allow for the forming and shearing of the next set of wire contacts.

14. In a machine for shaping and inserting wire contacts in place within electromagnetic relays, a shaping assembly adapted for reciprocatory movement, means for feeding wire stock to said assembly, die means carried by said assembly for shaping the wire stock to form wire contacts, shear means also carried by the assembly for severing the wire stock as formed from the fed wire stock, means for supporting a number of relay units, means including an element associated with the supporting means for moving said relay units in regular succession to a predetermined position with respect to the shaping assembly for receiving therefrom the wire contacts as formed, spring tensioning means for the several die and shear assembly elements, said means cooperating to permit the die and shear assembly elements to be moved in timed relation one with respect to the other for performing their forming and shearing functions, spring operated means for positively moving in a downward direction the upper portion of the shaping assembly to permit the several die and shear assembly elements to function in the forming and severing of wire contacts from said wire stock, cam means cooperating with said spring operated means for restoring the several die and shear assembly elements to their inactive positions after the inserting operation and prior to the return stroke of said shaping assembly for the next forming operation, and cam operated means for intermittently moving the shaping assembly as a unit with respect to each relay unit upon arrival at said predetermined receiving position for placing the wire contacts as formed within each relay unit and directly from said shaping assembly.

15. In a machine for shaping and inserting wire contacts in place within electromagnetic relays, said machine including a shaping assembly and mechanism for moving relay units one at a time to a raised position adjacent the shaping assembly for receiving wire contacts directly from said shaping assembly, means for feeding wire stock to said assembly, die means carried by said shaping assembly and including male and female die members for shaping the fed wire stock to form wire contacts, the female die member being topped with parallel wire containing and guiding grooves into which the wire stock is fed, means for intermittently closing the die means upon the wire stock in performing the shaping operation, shear means also carried by said assembly for severing the wire contacts as formed from the fed wire stock, said shear means including an upper shear member and a lower shear member also topped with parallel wire containing grooves which in the rest position of said shear members are arranged in substantial alignment with the wire containing and guiding grooves of the female die member for also receiving and guiding the wire stock as fed to the shaping assembly, said upper and lower shear members being rigidly connected together for movement as a unit with respect to an edge of the female die member for severing the formed wire contacts from the wire stock, and means for thereafter inserting the wire contacts so formed and severed in place within relay units in regular succession and in timed relation to the forming and severing means, said inserting operation being performed at a time when each relay unit is in a fixed rest position adjacent the shaping assembly.

16. In a machine for shaping and inserting wire contacts in place within electromagnetic relay units, and including means for forming the wire contacts, means for supporting and intermittently moving a series of relay units in regular succession timed with relation to the forming operation to permit each relay unit in turn to assume a rest inserting position adjacent the shaping assembly, intermittently operated means supported adjacent the rest inserting position assumed by each relay unit for temporarily placing within each relay unit upon arrival at said rest inserting position an element for guiding the formed wire contacts to definite positions within each relay unit one after the other and during the inserting operation, means for inserting the formed wire contacts in place within each relay unit after arriving at the rest inserting position and while the guiding element maintains its temporary position within each relay unit, and means for withdrawing the guide element after each wire contact inserting operation, said withdrawing operation being prior to and in timed relation to the intermittent movement of said series of relay units.

17. In a machine for shaping and inserting wire contacts in place within electromagnetic relays, comprising means for forming the wire contacts, means adjacent said forming means for supporting a series of relay units, means associated with said supporting means for intermittently moving the relay units one at a time to a fixed wire contact receiving position relative to the forming means, means including an element attached to the forming means for bodily moving the forming means toward a relay unit upon its arrival at the wire contact receiving position to thereby insert within each relay the wire contacts directly from the forming means, means for maintaining the relay unit in its fixed position during the inserting operation, said formed wire contacts being maintained in held relation with the forming means during the inserting operation, and means for releasing said formed wire contacts from their said held relation upon completion of the inserting operation and prior to the return stroke of the forming means for its next intermittent wire contact forming and inserting operation.

References Cited in the file of this patent

UNITED STATES PATENTS

| Number | Name | Date |
| --- | --- | --- |
| 1,019,457 | Graybill | Mar. 5, 1912 |
| 1,791,378 | Regenstrief | Feb. 3, 1931 |
| 1,795,195 | Blom | Mar. 3, 1931 |
| 1,907,532 | Flaws | May 9, 1933 |
| 2,177,739 | Nolan | Oct. 31, 1939 |
| 2,199,852 | Iden | May 7, 1940 |
| 2,222,605 | Carlson | Nov. 26, 1940 |
| 2,247,957 | Marogg | July 1, 1941 |
| 2,339,807 | Rau | Jan. 25, 1944 |
| 2,361,983 | Veley | Nov. 7, 1944 |
| 2,434,159 | Hoernle | Jan. 6, 1948 |
| 2,543,370 | Kludt | Feb. 27, 1951 |